United States Patent
Barkaröet al.

(10) Patent No.: US 6,542,520 B1
(45) Date of Patent: Apr. 1, 2003

(54) METHOD AND ARRANGEMENT FOR SECURING AN ADSL CONNECTION

(75) Inventors: Stefan Barkarö, Solna (SE); Albin Johansson, Vienna (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/304,273

(22) Filed: May 6, 1999

(30) Foreign Application Priority Data

May 12, 1998 (SE) .............................. 9801646

(51) Int. Cl.$^7$ ................................................ H04J 3/17
(52) U.S. Cl. ........................................ 370/493; 370/527
(58) Field of Search .................. 370/430, 493, 370/241, 252, 358, 264, 527; 375/222; 379/394, 93.08, 93.09

(56) References Cited

U.S. PATENT DOCUMENTS

| | | | |
|---|---|---|---|
| 5,613,190 A | 3/1997 | Hylton | |
| 5,740,075 A | 4/1998 | Bigham et al. | |
| 5,832,387 A | 11/1998 | Bae et al. | |
| 6,141,377 A | * 10/2000 | Sharper et al. | 375/222 |
| 6,212,227 B1 | * 4/2001 | Ko et al. | 375/222 |
| 6,263,077 B1 | * 7/2001 | Zuranski et al. | 375/222 |
| 6,272,219 B1 | * 8/2001 | De Bruycker et al. | 370/493 |
| 6,314,180 B1 | * 11/2001 | Bingel | 379/394 |

FOREIGN PATENT DOCUMENTS

| | | |
|---|---|---|
| EP | 0 653 873 A1 | 5/1995 |
| EP | 0 840 474 | 5/1998 |

OTHER PUBLICATIONS

""Splitterless" ADSL: Market, Requirements & Opportunities" Brown, AG Communication Systems (Mar. 23, 1998) pp. 1–8.*

Orckit Press Release Mar. 9, 1998 Orkit to show first live demonstration of Splitterless ADSL . . . pp. 1–3.*

* cited by examiner

*Primary Examiner*—Salvatore Cangialosi
(74) *Attorney, Agent, or Firm*—Burns, Doane, Swecker & Mathis, L.L.P.

(57) ABSTRACT

In an arrangement for securing an ADSL connection to an ADSL transceiver connected together with a telephone to a common telephone line; there are devices for setting a first number and a second, lower number, respectively, of bits to be allocated to the ADSL connection. Moreover, there are devices for detecting whether or not a ringing signal is present on the line and whether the telephone is in the off-hook or the on-hook condition. The first number of bits is allocated when neither the ringing signal nor the off-hook condition is detected, and the second, lower number of bits is allocated when the ringing signal and/or the off-hook condition is detected.

8 Claims, 1 Drawing Sheet

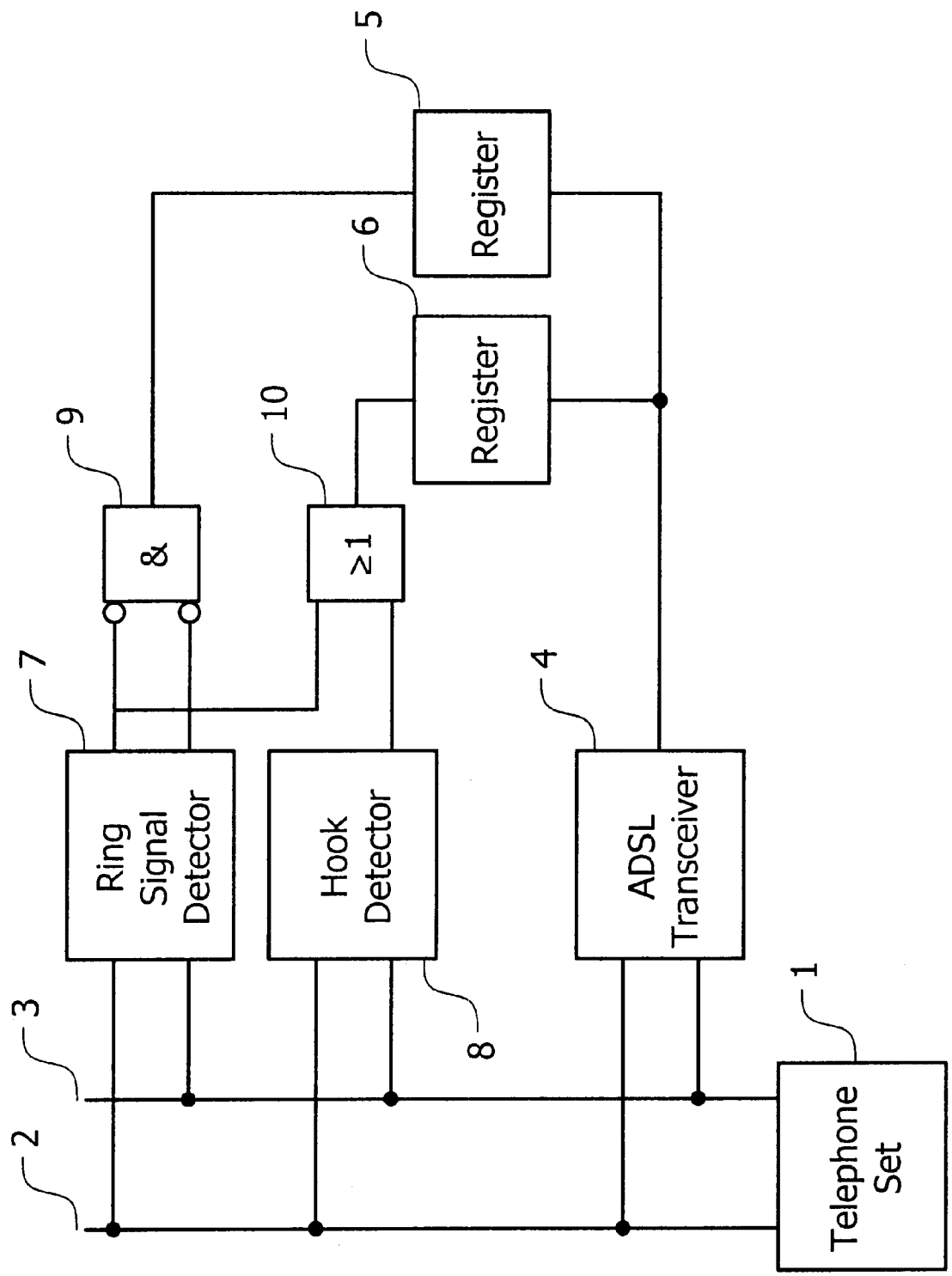

METHOD AND ARRANGEMENT FOR SECURING AN ADSL CONNECTION

This application claims priority under U.S.C. §§119 and/or 365 to 9801646-2 filed in Sweden on May 12, 1998; the entire content of which is hereby incorporated by reference.

TECHNICAL FIELD

The invention relates generally to Asymmetrical Digital Subscriber Line (ADSL) systems and more specifically to a method and an arrangement for securing an ADSL connection to an ADSL transceiver connected together with a telephone to a common telephone line.

BACKGROUND

In ADSL systems, data signals are transferred at the same time as telephony on a common telephone line.

The telephone traffic and the ADSL traffic have to be able to coexist on the telephone line, i.e. one should be able to talk in a telephone at the same time as one is connected with a computer without disturbing either traffic.

In traditional ADSL technology, this is solved by means of a so called splitter, which in principle is a high-order filter which is connected in series with the telephone and makes the telephone "invisible" for ADSL signals. By means of such a filter, disturbances from the telephone to an ADSL modem are avoided, e.g. when the telephone goes off-hook, i.e. when the impedance in the telephone is abruptly changed from a high to a low value. Without such filter, this would result in a changed attenuation of the ADSL signals and, consequently, in a changed signal-to-noise ratio. In its turn, this could cause the ADSL system to loose synchronization, since the modem is set up for signal-to-noise ratios that existed when the modem was initiated.

The major problem with such a splitter filter is that it is very expensive and bulky. Moreover, it takes a specialist to install such a filter, which makes it even more expensive.

To facilitate the exploitation of ADSL, a form of ADSL has been defined, for which it will be possible to run telephone traffic and ADSL traffic simultaneously without such splitters but with reduced performance. This application is popularly called ADSL-Lite or splitterless ADSL.

However, the risk of loosing the synchronization still remains.

Upon a call to the telephone, the telephone station first sends out a ringing signal having a frequency between 20 and 60 Hz depending on the market, and having a signal level which is specified to be at least 40 V r.m.s. at the telephone. Often, the level is considerably higher.

When the telephone goes off-hook, the impedance is abruptly changed to a considerably lower level.

In the case of ADSL, it is of particular interest which impedance the telephone has in the ADSL band.

For ADSL-Lite, a downstream band, i.e. traffic from the station to the subscriber, of around 400 kHz is considered, while an upstream band, i.e. traffic from the subscriber to the station, of 138 kHz is considered.

Measurements of some typical telephones give the following impedance values:

On-hook impedance @100 kHz=3 k$\Omega$

On-hook impedance @400 kHz=800$\Omega$

Off-hook impedance @100 kHz=60$\Omega$

Off-hook impedance @400 kHz=8$\Omega$

The driving and terminating impedance of the ADSL modem is normally adapted to the characteristic impedance of the telephone line within the ADSL band, which is around 100$\Omega$. Considering the load that the modem on the subscriber side sees looking out onto the line, it will be very different in the above cases.

Suppose that the characteristic impedance of the line is equal to 100$\Omega$ and that the line is correctly terminated on the station side with 100$\Omega$ in the ADSL band.

The load seen looking out from the modem is of importance only for the upstream band, i.e. up to 138 kHz:

Load On-hook @100 kHz=97$\Omega$

Load-Off hook @100 kHz=37$\Omega$

In the same manner as the load changes, the terminating impedance for downstream traffic will change:

Terminating Impedance On-hook @400 kHz=89$\Omega$

Terminating Impedance Off-hook @400 kHz=7.5$\Omega$

In principle, this means that both the incoming and outgoing signals will be considerably more attenuated for the off-hook case than with the telephone in on-hook condition. This implies a great risk for the ADSL system to loose the synchronization, since bit allocation is carried out in correspondence to the conditions at hand during the training sequence which is normally run with the telephone in on-hook condition.

ADSL utilizes discrete multitone (DMT) coding according to which the available bandwidth is divided into 4.3 kHz channels. During the training sequence, the signal-to-noise ratio in all channels is measured and, thereafter, it is decided how many data bits can be allocated to a certain carrier channel.

For ADSL-Lite, 256 QAM (Quadrature Amplitude Modulation) is used, which means that a maximum of 8 bits can be allocated to each carrier channel. When the telephone goes off-hook, the signal levels will be lowered due to further attenuation which means that the signal-to-noise ratio will be degraded.

The upstream traffic will have a three times lower signal level or a signal-to-noise ratio degradation of 9.5 dB, while the degradation downstreams can be as much as twelve times or 21.5 dB. Due to this considerable impedance change in the ADSL band in off-hook condition of the telephone in an ADSL-Lite application, the signal-to-noise ratio is degraded so much that the system will loose the synchronization and have to be restarted by means of a new training sequence.

SUMMARY

The object of the invention is to secure an ADSL connection when the telephone goes off-hook.

This is attained in accordance with the invention by detecting the ringing signal and whether the telephone is on-hook or off-hook and, in response hereto, allocating different numbers of bits to the ADSL connection.

Hereby, the risk of loosing synchronization will be more or less eliminated.

BRIEF DESCRIPTION OF THE DRAWING

The invention will be described more in detail below with reference to the appended drawing on which the single Figure shows one embodiment of an arrangement according to the invention for securing an ADSL connection.

DETAILED DESCRIPTION

The single Figure illustrates a conventional telephone set 1 connected to wires 2 and 3 of a two-wire telephone line from a telephone station (not shown).

An ADSL transceiver 4 is also connected to the wires 2 and 3 to establish an ADSL connection.

The number of bits to be allocated to the ADSL connection is decided in accordance with the following algorithm:

$$SNR=3N_{CONST}+K$$

where SNR is the signal-to-noise ratio in the carrier channel measured during initiation of the modem, $N_{CONST}$ is the constellation size in bits on a certain carrier, and K is a constant.

Thus from the above equation, it can be seen that if the constellation size is reduced by one bit, a 3 dB lower signal-to-noise ratio can be accepted.

In the illustrated embodiment of the invention, the signal-to-noise ratio of the ADSL connection is measured both in on-hook and off-hook condition of the telephone 1. Also, in correspondence to the measured ratios, a first number or bits to be allocated to the ADSL connection, is set in a first register 5 in correspondence to the measured signal-to-noise ratio in on-hook condition of the telephone 1, while a second., lower number of bits to be allocated to the ADSL connection, is set in a register 6 in correspondence to the measured signal-to-noise ratio in off-hook condition of the telephone 1.

The number of bits set in the registers 5 and 6 can be transferred via respective register output terminals connected to the ADSL transceiver 4 as will be described below.

In accordance with the invention, a ringing signal detector 7 is connected with its input terminals to the wires 2 and 3 of the telephone line to detect whether or not a ringing signal is present on the line.

Also, in accordance with the invention a hook detector 8 is connected with its input terminals to the wires 2 and 3 of the telephone line to detect whether the telephone 1 is in off-hook or on-hook condition.

The output terminal of the ringing signal detector 7 is, in the illustrated embodiment, connected to an inverting input terminal of an AND circuit 9, on the one hand, and to one of the inputs of an OR circuit 10, on the other hand. The output terminal of the hook detector 8 is connected to another inverting input terminal of the AND circuit 9, on the one hand, and to the other input terminal of the OR circuit 10, on the other hand.

The output terminal of the AND circuit 9 is connected to a control input of the register 5 to control the release of the bit number stored in that register to the ADSL transceiver 4, while the output terminal of the OR circuit 10 is connected to a control input of the register 6 to control the release of the bit number stored in that register to the ADSL transceiver 4.

The ringing signal detector 7 outputs a "1" as long as a ringing signal is detected on the telephone line, and a "0" when no ringing signal is present on the telephone line. The hook detector 8 outputs a "1" in off-hook condition of the telephone 1, and a "0" in on-hook condition of the telephone 1.

Thus, in the embodiment shown, the AND circuit 9 outputs an "1" to trigger the register 5 to release its bit number when the ringing signal detector outputs a "0" at the same time as the hook detector 8 outputs a "0".

Thus, in that situation, the bit number stored in the register 5 is released to the ADSL transceiver 4.

When the ringing signal detector 7 outputs an "1", the OR circuit 10 will output an "1" to the register 6, whereby the bit number stored in the register 6 will be released to the ADSL transceiver 4. The same occurs when the hook detector 8 outputs an "1". The same is also true when both the ringing signal detector 7 and the hook detector 8 output "1s".

Thus, in those situations, i.e. when a ringing signal and/or an off-hook condition is detected, the lower bit number is released to the ADSL transceiver 4 to counteract the large impedance change when the telephone set is anticipated to go off-hook or goes off-hook.

If the telephone 1 does not go off-hook in response to a ringing signal on the line, the bit allocation will be reset to the number contained in the register 5 as soon as the ringing signal disappears.

What is claimed is:

1. A method of securing an ADSL connection to an ADSL transceiver connected together with a telephone to a common telephone line, comprising the steps of:

setting a first number and a second, lower number, respectively, of bits to be allocated to the ADSL connection, detecting whether or not a ringing signal is present on the line and whether the telephone is in the off-hook or the on-hook condition, allocating the first number of bits when neither the ringing signal nor the off-hook condition is detected, and allocating the second, lower number of bits when the ringing signal and/or the off-hook condition is detected.

2. The method of claim 1, wherein the first and the second number of bits to be allocated are set in correspondence to measurements of signal-to-noise ratios of the ADSL connection in an on-hook and an off-hook condition, respectively, of the telephone.

3. An arrangement for securing an ADSL connection to an ADSL transceiver connected together with a telephone to a common telephone line comprising characterized by means for setting a first number and a second, lower number, respectively, of bits to be allocated to the ADSL connection, means for detecting whether or not a ringing signal is present on the line and whether the telephone is in the off-hook or the on-hook condition, means for allocating the first number of bits when neither the ringing signal nor the off-hook condition is detected, and means for allocating the second, lower number of bits when the ringing signal and/or the off-hook condition is detected.

4. The arrangement of claim 3, wherein the means for setting is controlled by means for measuring signal-to-noise ratios of the ADSL connection in both an on-hook and an off-hook condition, respectively, of the telephone.

5. A method of securing an ADSL connection to an ADSL transceiver connected together with a telephone to a common telephone line, comprising:

setting a first number of bits and a second number of bits to be allocated to the ADSL connection, wherein the second number is lower than the first number;

detecting a ringing signal on the line;

allocating the second, lower number of bits when the ringing signal is detected;

maintaining the allocation of the second, lower number of bits if the telephone is detected to go off-hook; and allocating the first number of bits if the telephone is not detected to go off-hook.

6. The method according to claim 5, wherein the first and the second number of bits are set corresponding to measurements of signal-to-noise ratios of the ADSL connection in an on-hook and an off-hook condition, respectively, of the telephone.

7. An arrangement for securing an ADSL connection to an ADSL transceiver connected together with a telephone to a common telephone line, comprising:

means for setting a first number of bits and a second number of bits to be allocated to the ADSL connection, such that the second number is lower than the first number;

means for detecting a ringing signal on the line;

means for allocating the second, lower number of bits when the ringing signal is detected and for maintaining the allocation of the second, lower number of bits if an off-hook condition is detected; and means for allocating the first number of bits if an off-hook condition is not detected.

8. The arrangement according to claim 7, wherein said means for setting is controlled by means for measuring signal-to-noise ratios of the ADSL connection in both, an on-hook and an off-hook condition, respectively, of the telephone.

* * * * *